July 8, 1958     J. L. PHILIPS ET AL     2,842,112
METHOD FOR REDUCING CORROSION IN LUBRICATION SYSTEMS
Filed Dec. 20, 1954
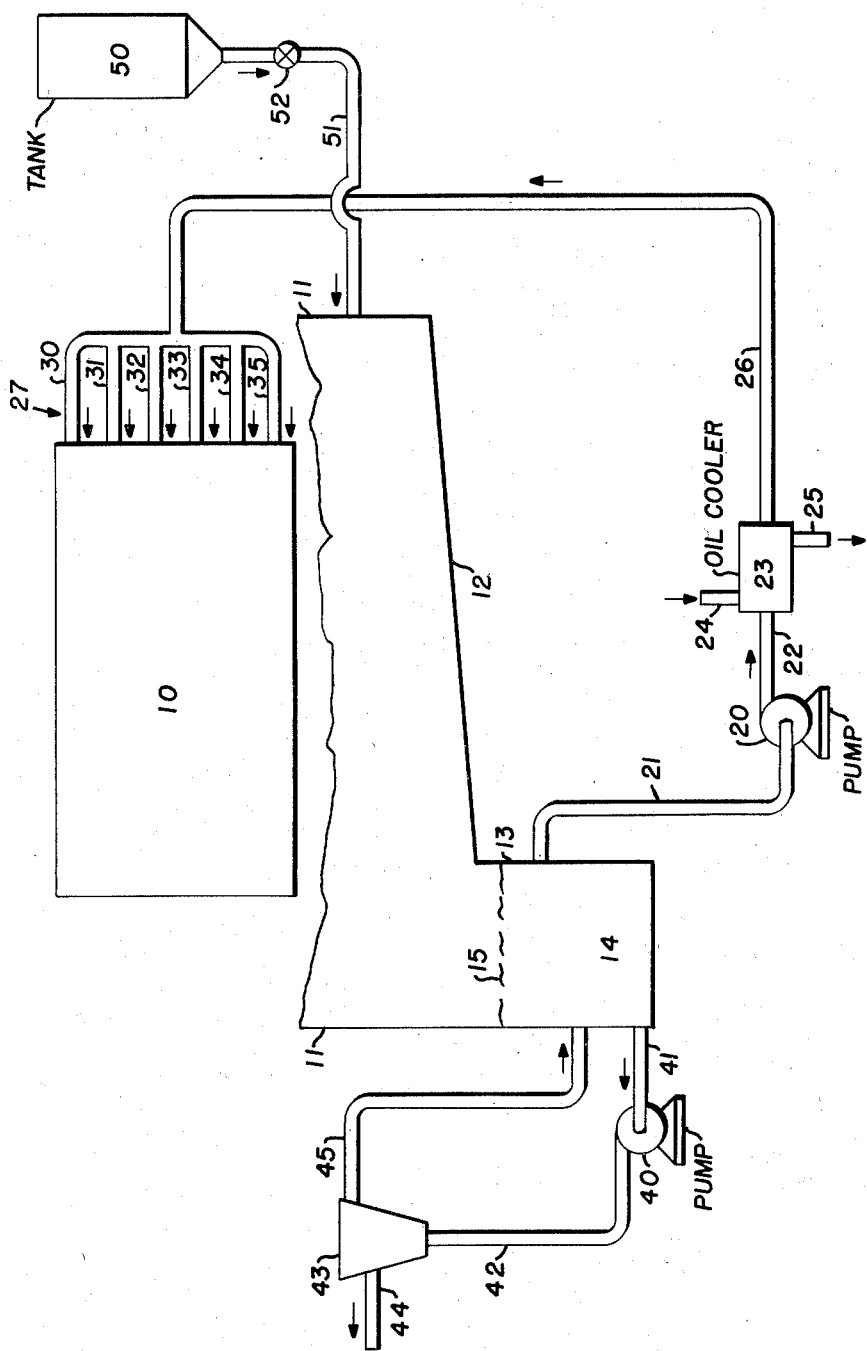
Judson L. Philips
John J. Kolfenbach     Inventors
By    Attorney

United States Patent Office 2,842,112
Patented July 8, 1958

2,842,112

METHOD FOR REDUCING CORROSION IN LUBRICATION SYSTEMS

Judson L. Philips, Upper Montclair, and John J. Kolfenbach, North Plainfield, N. J., assignors to Esso Research and Engineering Company, a corporation of Delaware Application December 20, 1954, Serial No. 476,356

3 Claims. (Cl. 123—196)

This invention relates to metal corrosion in the lubrication systems of machinery such as internal combustion engines and more particularly relates to a method for reducing such corrosion. Still more particularly, this invention relates to a method for reducing metal corrosion in marine diesel engines burning high sulfur content fuels, which comprises adding to the lubricating oil flowing from the engine an aqueous solution of an alkali metal phosphate in an amount sufficient to inhibit metal corrosion, and subsequently separating the aqueous salt solution from the lubricating oil prior to its recirculation to the engine.

It is well known that lubricating oils become contaminated with various acidic materials and thus cause corrosion of various metal parts which are in contact with the lubricating oil. This is particularly true in the lubrication systems of internal combustion engines wherein the lubricating oil becomes contaminated with acidic gases, such as nitrogen oxides and carbon dioxide from combustion of air and fuel; and from sulfur dioxide, sulfur trioxide, and the like as a result of the combustion of a fuel containing sulfur. A particular problem in this respect is being encountered at the present time in marine diesel engines wherein, for economic reasons, the conventional diesel fuels are being replaced by heavy fuels such as bunker fuel. Although these heavy fuels are relatively inexpensive, they contain high percentages of sulfur, for example, about 1–4% by weight. During the combustion of these high sulfur-content heavy fuels in marine diesel engines, sulfur oxides are formed which react with water, which is also formed in the combustion process, to form strong acids. These acids are corrosive and are carried throughout the lubrication systems of the ship's machinery by the lubricating oil.

One of the lubrication systems in these marine diesel engines is the engine bearing lubrication system, the lubricating oil of which lubricates bearings such as the connecting rod bearings, the crank shaft bearings, and the like, and also contacts the connecting rods and crankshafts. High wear and corrosion of these critical engine parts results from the acids present in the bearing oil. Although corrosion inhibiting additives have been proposed heretofore for reducing corrosion in oil lubrication systems, the utilization of such additives has been relatively ineffective in these marine diesel engine lubrication systems wherein a considerable amount of corrosive acids are continuously introduced from an extraneous source into the lubricating oil.

A method has now been found for effectively eliminating or at least substantially reducing the corrosion encountered in lubrication systems and particularly in the lubrication systems of internal combustion engines such as marine diesel engines and gas turbines wherein a relatively high sulfur content fuel is employed. In accordance with the present invention, metal corrosion is reduced in the oil lubrication system by adding to the lubricating oil flowing from the engine an aqueous solution of an alkali metal phosphate in a small, but sufficient amount to inhibit metal corrosion, and subsequently separating the aqueous salt solution from the lubricating oil prior to its recirculation to the engine. The method of this invention is especially useful in those lubrication systems wherein conventionally a portion of the lubricating oil is periodically or continuously removed from the system for removal of accumulated impurities such as water, sludge, resins, etc., and the purified oil is then returned to the lubrication system; because in these systems the aqueous salt solution which during use takes up the corrosive acids may be also rejected from the system at the same time as the other impurities. Since marine diesel engines are provided with apparatus for withdrawing a portion of the lubricating oil (including the aforementioned impurities as well as water-oil emulsions) from the bearing oil crankcase sump and for centrifuging this oil to remove water and other impurities, the method of this invention may be advantageously employed in such engine bearing lubrication systems. These marine diesel engines are also provided with a second lubrication system which lubricates the cylinders of the diesel engine. This latter system is to be distinguished from the lubricating oil system which lubricates the engine bearings and which type of system is the subject of the present invention.

The amount of the alkali metal phosphate employed should be sufficient to reduce metal corrosion. In general it has been found that a sufficient amount of the salt should be added to maintain the pH of the oil above at least about 4.0, preferably in the range of about 5 to 11, and even more preferably in the range of about 6 to 8 to thereby substantially reduce corrosion. The preferred salt is trisodium orthophosphate, $Na_3PO_4$.

The method of this invention will be best understood by reference to the accompanying drawing which is a diagrammatic illustration shown in partial cross-section of the bearing lubrication system of a typical marine diesel engine which is provided with apparatus for carrying out an embodiment of the method of the present invention.

Referring now to the drawing, reference character 10 designates a marine diesel engine which is provided with a bearing oil crankcase 11 adapted to collect the lubricating oil draining from the various diesel engine bearings such as the main bearings, connecting rod bearings, crankshaft bearings, and the like. The bearing lubricating oil draining into crankcase 11 passes downwards and to the left in the drawing over slanting bottom surface 12 and passes into oil sump 13. A body of oil 14 having an upper level 15 is maintained in sump 13 during the operation of engine 10. Oil is continuously pumped by means of pump 20 from sump 13 through line 21 and is passed through line 22 to oil cooler 23 wherein the lubricating oil is cooled by means of a coolant, such as water, introduced in indirect heat exchange with the oil through line 24 and removed through line 25. The cooled oil is passed by means of conduit 26 to the bearing lubricating oil distribution system 27 wherein the oil is passed to the individual engine bearings by means of a plurality of small feed lines such as lines 30, 31, 32, 33, 34, and 35.

In general, a small amount of oil is continuously withdrawn from the bottom of sump 13 by means of pump 40 through line 41. This oil contains water, oil-water emulsions, sludge, and other impurities which settle in the lower portion of sump 13 and which have been introduced into the oil during the combustion operation in engine 10. The oil discharged from pump 40 is passed through line 42 into centrifuge 43 wherein the aforementioned impurities are separated from the lubricating oil. These impurities are removed by means of line 44 and the purified lubricating oil is returned to sump 13 by means of line 45.

In accordance with the present invention, an aqueous solution of an alkali metal phosphate is introduced into the lubricating oil in an amount sufficient to reduce or inhibit metal corrosion. This is accomplished by means of tank 50, conduit 51, and valve 52. More specifically, a supply of the aqueous salt (alkali metal phosphate) solution is maintained in storage tank 50 wherefrom the aqueous salt solution is passed into crankcase 11 by opening valve 52 in line 51 and permitting the aqueous salt solution to flow into crankcase 11. The aqueous salt solution may be prepared, if desired, in tank 50 by simply mixing together the alkali metal phosphate with a sufficient quantity of water to completely dissolve the salt. Preferably a saturated salt solution is prepared. The alkali metal phosphates employed in this invention will be discussed in greater detail hereinafter.

The aqueous salt solution introduced into crankcase 11 through conduit 51 passes downward and to the left in the figure over bottom surface 12 contacting oil drainage from the bearings in engine 10 and passes through the body of oil 14 contained in sump 13 to the bottom of sump 13. It has been found that this particular method provides sufficient contact between the lubricating oil and the aqueous salt solution to remove sufficient acids from the lubricating oil to thereby eliminate or at least substantially reduce corrosion throughout the bearing lubrication system of diesel engine 10. In general, it is preferred to introduce this aqueous salt solution periodically, for example, once a day. However, it will be understood that, if desired, the aqueous salt solution may be continuously introduced or intermittently introduced. Regardless of the manner of introducing the aqueous salt solution to the oil, it is essential that a sufficient quantity of the aqueous salt solution be added so as to maintain the pH of the oil above at least 4.0. It has been found that at a pH below about 4.0, considerable corrosion is encountered with such bearings as the connecting rod bearings, crankshaft bearings, and the like, and with the connecting rods, crankshaft and the like, but that this corrosion is substantially reduced by maintaining the pH of the oil above about 4.0. Preferably the pH of the oil is maintained in the range of about 5 to 11 and even more preferably the pH is maintained in the range of about 6 to 8. The amount of the aqueous salt solution employed can be best expressed in terms of the pH of the oil since the particular amount of salt solution expressed, for example, as pounds of salt/barrel of oil/day will depend on many variables, such as the severity of engine operation, the sulfur content of the fuel burned in the internal combustion engine, the type of lubricating oil employed, the alkalinity of the particular salt added, etc. Therefore, the most convenient method for determining the amount of salt to be added in the method of this invention is to measure the pH of the oil. Of course other similar methods for determining the corresponding acidity (or alkalinity), such as by determining the acid number or the base number may be likewise utilized. These determinations (of pH, base number and acid number) may be carried out as set forth in ASTM D–664–52.

The pH may be determined continuously or intermittently as desired. If the pH is determined intermittently preferably the determination is made daily. Also it may be advantageous to have the addition of the aqueous salt solution to the crankcase controlled automatically. More specifically valve 52 can be activated in response to a pH meter permanently installed in, for example, conduit 26 so that when the pH of the stream of oil in conduit 26 falls below the desired pH (such as 6.0) valve 52 is opened to permit the addition of the aqueous salt solution to crankcase 11. Very generally the amount of $Na_3PO_4$ added will be in the range of about 0.05–5.0 lbs. of $Na_3PO_4$/day/1000 gallons of oil in the lubrication system.

After the aqueous salt solution has passed through crankcase 11 and through body of oil 14 in sump 13, the salt solution has removed a certain amount of the acids from the oil and is thus referred to herein as a used aqueous salt solution. It will be understood that the term "used aqueous salt solution" will refer to those solutions which have contacted the oil to remove any acidic materials therefrom. It will further be understood that by "used aqueous salt solution" is meant not only a solution which is completely exhausted or spent in its ability to further remove acidic materials from the oil but will also refer to solutions which are only partially exhausted in this respect.

The used aqueous salt solution collects at the bottom of sump 13 together with other impurities, such as water and sludge, formed in the combustion in engine 10. Thus the used aqueous salt solution is removed together with these other impurities from the bottom of sump 13 by means of pump 40 through conduit 41, and is passed through conduit 42 into centrifuge 43. The used aqueous salt solution is separated in centrifuge 43 together with the other impurities from the lubricating oil so that the used aqueous salt solution is rejected from centrifuge 43 and the lubrication system through conduit 44; the purified lubricating oil is passed through conduit 45 back to sump 13 of the lubrication system. Thus it will be seen that in the method of this invention the corrosive acids formed particularly in marine diesel engine 10 from the combustion of sulfur-containing fuels are effectively removed from the bearing lubrication system and it will be further noted that this removal of acids is accomplished without a build-up of any salts in the lubrication system so that the operation of marine diesel engine 10 is not hampered by the presence of insoluble salts in the bearing lubricating oil.

In general, the salts which are useful for the purposes of the present invention are alkaline alkali metal phosphates. These salts are relatively water-soluble and relatively oil-insoluble so that the salts are readily removed from the bearing lubricating oil prior to its recirculation to the engine bearings as described above. The preferred alkali metal phosphates useful in the present invention are the normal phosphates, that is those salts in which all of the hydrogen atoms of the acid have been displaced. Alkaline alkali metal phosphates which contain hydrogen atoms may be employed if desired but are less effective than the normal salts. The preferred alkali metal is sodium as it is more effective than the other alkali metals. Potassium is the second choice; lithium is less elective than either potassium or sodium. The preferred salt employed in the method of this invention is tri-sodium orthophosphate, $Na_3PO_4$, which is normally available in the hydrated form $Na_3PO_4 \cdot 12H_2O$. The phosphates which may be employed as the salt in this invention include the alkali metal salts of ortho-, meta-, hypo- and pyro- phosphoric acids, and the corresponding polyphosphates. Specific examples of such alkali metal phosphates include:

Tri-sodium orthophosphate, $Na_3PO_4$
Sodium metaphosphate, $NaPO_3$
Tetra-sodium pyrophosphate, $Na_4P_2O_7$
Tetra-sodium hypophosphate, $Na_4P_2O_6$
Penta-sodium tri-polyphosphate, $Na_5P_3O_{10}$
Di-sodium orthophosphate, $Na_2HPO_4$
Tri-sodium pyrophosphate, $Na_3HP_2O_7$
Tri-sodium hypophosphate, $Na_3HP_2O_6$ and the corresponding salts of potassium and lithium. Mixtures of these salts may be employed if desired.

The lubricating oils employed in marine diesel engines are ordinarily mineral oils. These mineral oils may be refined by various methods well known to the art such as solvent extraction, solvent dewaxing, acid treating, clay treating/filtering, and the like. Preferred lubricating oils are acid treated distillates of lubricating viscosity (about 300–1000 S. S. U. viscosity at 100° F.) obtained from low cold test crude oils. Generally no additives are incorporated into these lubricating oils although if desired anti-oxidants, detergents, corrosion inhibitors, and the like may be included in the compositions.

The invention will be more fully understood by reference to the following examples. It is pointed out, however, that the examples are given for the purpose of illustration only and are not to be construed as limiting the scope of the invention in any way.

EXAMPLE I

A sample of a used lubricating oil which had been employed to lubricate the bearings of a marine diesel engine was evaluated in a modified ASTM rust test. The original lubricating oil was a 100% acid treated distillate following composition: 80% tin, 12% antimony, 6% copper and 2% lead. Metal C is sold under the trade name "Dubl-Du-T" by E. I. Post. The other metal specimen, hereinafter referred to as metal D and sold under the name of Parson's White Brass, had the following composition: 85% tin, 8% antimony and 7% copper. Metals C and D corresponded to the bearing metals used in marine diesel engines.

The metal specimens were suspended in the test compositions for 48 hours at 195° F. with stirring and were thereafter removed from the test compositions and washed with ASTM precipitation naphtha and their appearance noted. The test compositions, after the above-described test, were allowed to settle and were then centrifuged to remove the aqueous phase and were then evaluated for pH, acid number and base number (according to ASTM D–664–52). The results which were obtained in the above-described modified ASTM rust test are presented in Table I.

*Table I.—Marine diesel engine oil corrosion test results*

| Composition Tested | | | | Test Metal Specimens | | | Engine Oil After Rust Test | | |
|---|---|---|---|---|---|---|---|---|---|
| Number | Used Engine Oil Volume (ml.) | Aqueous Phase | | Material | Δ Wt. (mg.) | Appearance | pH | Neutralization Number ASTM D-664 | |
| | | Type | Vol. (ml.) | | | | | Acid No. | Base No. |
| I [1] | 270 | A [2] | 60 | C | 0.4 | Smooth and bright—Very light tarnish. | 2.0 | 0.99 | Negative |
| | | | | D | 0.5 | do | | | |
| | | | | S | −6.7 | Medium rust and pitting—No discoloration. | | | |
| II [1] | 270 | B [3] | 60 | C | −11.7 | Rough—light gold to dark brown. | 10.3 | 0.14 | 0.35 |
| | | | | D | −15.8 | do | | | |
| | | | | S | −0.1 | No change—smooth and bright. | | | |
| III [4] | 330 | None | | C | +2.6 | Smooth—light gold to brown, blue and gray. | 10.4 | 0.04 | 0.77 |
| | | | | D | +2.0 | Smooth—light gold to steel gray and blue. | | | |
| | | | | S | +0.2 | No change—smooth and bright. | | | |

[1] Samples settled and centrifuged to remove aqueous phase before determining neutralization number.
[2] Distilled water.
[3] Saturated solution (at 195° F.) of Na₃PO₄ in distilled water.
[4] Prior to the corrosion tests, the oil was treated with a saturated water solution of Na₃PO₄, settled and centrifuged to remove the solution of Na₃PO₄.

from low cold test crude and had the following general range of properties:

| | |
|---|---|
| Gravity, API | 21.0–23.5 |
| Color—Robinson | 9.0–13.0 |
| Flash ° F.—open cup | >410 |
| Carbon residue percent | <0.2 |
| Acid number | <0.10 |
| pH | 8–9 |
| Viscosity, S. U. S. at 100° F | 750–770 |

The used lubricating oil which was utilized in these tests had a pH of about 2.6, an acid number of about 0.29 and a "negative" base number (as determined by ASTM D–664–52). Three individual test compositions, each having a volume of 330 ml., were prepared. One of the test compositions (composition I) was a blend of the used lubricating oil and distilled water. Another (composition II) was a blend of the used lubricating oil and an aqueous phase consisting of a saturated distilled water solution of $Na_3PO_4$. The other test composition (composition III) was an oil composition prepared by treating the used lubricating oil with a saturated solution of $Na_3PO_4$ and thereafter separating the aqueous phase from the resultant treated oil.

Each of the test compositions was placed in an individual glass beaker, in each of which beakers were suspended three metal specimens. One of the metal specimens, hereinafter referred to as metal S, was a polished, round steel (grade 1020 of the tentative specifications for cold-finished carbon-steel bars and shafting—ASTM designation: A-108) rod fitted to a plastic holder. Metal S corresponded to steel employed in the crankshafts and the like in marine diesel engines. Another of the metal specimens, hereinafter referred to as metal C, had the It will be noted that composition I caused rusting and pitting of metal S and also that the used lubricating oil recovered therefrom after the test was highly acidic. On the other hand, composition II which contained an $Na_3PO_4$ solution and composition III which had been treated with an $Na_3PO_4$ solution caused essentially no deleterious effects to metal S. It will be noted here that the used lubricating oils recovered from compositions II and III after the tests were alkaline, having a pH of about 10. These tests demonstrate the effectiveness of $Na_3PO_4$ in reducing the corrosion of steel by acidic lubricating oils. Particular difficulty is encountered in marine diesel engines (burning high sulfur fuels) with corrosion of the steel crankshafts. These crankshafts are extremely expensive, and difficult and costly to replace. The data in Table I demonstrate the effectiveness of the present invention in preventing corrosion of such steel crankshafts.

It will be also noted that composition II caused corrosion of metals C and D whereas compositions I and III had essentially no effect on these bearing metals. This portion of the tests shows the necessity for removing the $Na_3PO_4$ from the lubricant composition prior to circulating the lubricating oil to the engine parts from the crankcase to thereby prevent corrosion of bearing metals.

EXAMPLE II

The method of this invention was employed to prevent corrosion in a marine diesel engine employed in a 19,000 ton tanker. The marine diesel engine was about 70′ long, 15′ wide, 40′ high, and had a rated horsepower of about 7500. It employed about 1,500 gallons of the lubricating oil described in Example I. The bearing lubrication system of this diesel engine was in general essentially the same as that shown in the diagram accompanying this specification. Thus the marine diesel engine was provided with a centrifuge which removed impurities such as water, sludge and the like from the bearing lubricating oil contained in the bearing oil crankcase sump.

After about five months of operation of the marine diesel engine (while burning a bunker fuel having a sulfur content of about 2.25%) the lubricating oil had a pH of about 2.5. Then about 1 lb. per day of $$Na_3PO_4 \cdot 12 H_2O$$

(as a saturated aqueous solution) was added once a day on a "one-shot" basis to the bearing oil crankcase containing the acidic lubricating oil. The used aqueous phosphate solution was subsequently removed by means of the centrifuge prior to the recirculation of the oil to the engine bearings. The effect of adding about 1 lb. of phosphate each day to the bearing lubricating oil in the diesel engine crankcase is shown below:

Table II.—*Used engine oil inspection*

| Days | pH | Neutralization Number ASTM D-664 | | Ash, wt. Percent | Insolubles, Wt. percent | | |
|---|---|---|---|---|---|---|---|
| | | | | | Insoluble [1] in— | | Resins |
| | | Acid No. | Base No. | | Isopentane | Benzene | |
| 0 | 2.5 | 0.57 | Negative | 0.05 | 0.33 | 0.24 | 0.09 |
| 4 | 3.0 | 0.50 | do | 0.08 | 0.38 | 0.26 | 0.12 |
| 11 | 3.8 | 0.48 | 0.02 | 0.09 | 0.40 | 0.30 | 0.10 |
| 98 | 6.1 | 0.22 | 0.15 | <0.01 | 0.06 | 0.03 | 0.03 |
| 110 | 7.1 | 0.14 | 0.16 | <0.01 | 0.04 | 0.02 | 0.02 |
| 138 | 7.1 | 0.24 | 0.12 | <0.01 | 0.05 | 0.02 | 0.03 |

[1] These materials in their present state are generally oil soluble, but eventually will form undesirable sludge if not removed.

It will be noted in the above table that the addition of the trisodium phosphate to the lubricating oil steadily increased the pH of the lubricating oil and eventually maintained the pH of the lubricating oil at about 7. No corrosion difficulties in any phase of the engine's operation were experienced in this tanker which employed the $Na_3PO_4$ treatment of this invention, whereas in other tankers in the same fleet which did not use this $Na_3PO_4$ treatment, corrosion problems were encountered.

It will be further noted in Table II that the $Na_3PO_4$ treatment reduced the percent ash of the lubricating oil and also reduced the percent insolubles (percent insoluble in isopentane and benzene; and resin content). Although the mechanism which caused these effects cannot be explained at the present time it is believed that these desirable factors had a substantial effect on the improved engine operation which was noted.

It will be understood that although the present invention has been described as being especially useful for preventing corrosion in the bearing lubrication system of marine diesel engines, the method of the present invention may be advantageously employed with lubrication systems of other internal combustion engines or other machinery wherein the alkali metal phosphates may be added to the oil flowing from the engine and subsequently removed prior to the recirculation of the oil back to the engine parts.

What is claimed is:

1. In the lubrication of marine diesel engines operating on fuels containing from 1 to 4 wt. percent sulfur, which fuel on burning results in the formation of oxides of sulfur which results in the contamination of the bearing lubricating oil, and wherein a portion of the bearing lubricating oil is removed from its crankcase, centrifuged to separate out impurities and the purified oil returned to said crankcase, the improvement which consists essentially of adding to the lubricating oil in said crankcase, an aqueous solution of an alkaline alkali metal phosphate in an amount sufficient to maintain the pH of said oil within a range of 5 to 11, the resultant used aqueous salt solution being subsequently removed from the lubricating oil together with said aforementioned impurities by centrifuging.

2. Method according to claim 1 wherein said phosphate is trisodium orthophosphate.

3. Method according to claim 1 wherein the amount of said phosphate added is in the range of about 0.05–5.0 lbs./day/1000 gallons of said bearing lubricating oil.

References Cited in the file of this patent

UNITED STATES PATENTS

| 1,553,141 | Clark | Sept. 8, 1925 |
| 1,661,731 | Meston | Mar. 6, 1928 |
| 1,747,161 | Clark | Feb. 28, 1930 |
| 1,770,736 | Funk | July 15, 1930 |
| 1,788,911 | Clark | Jan. 13, 1931 |
| 2,262,526 | Fairlie | Nov. 11, 1941 |